Figure 1:
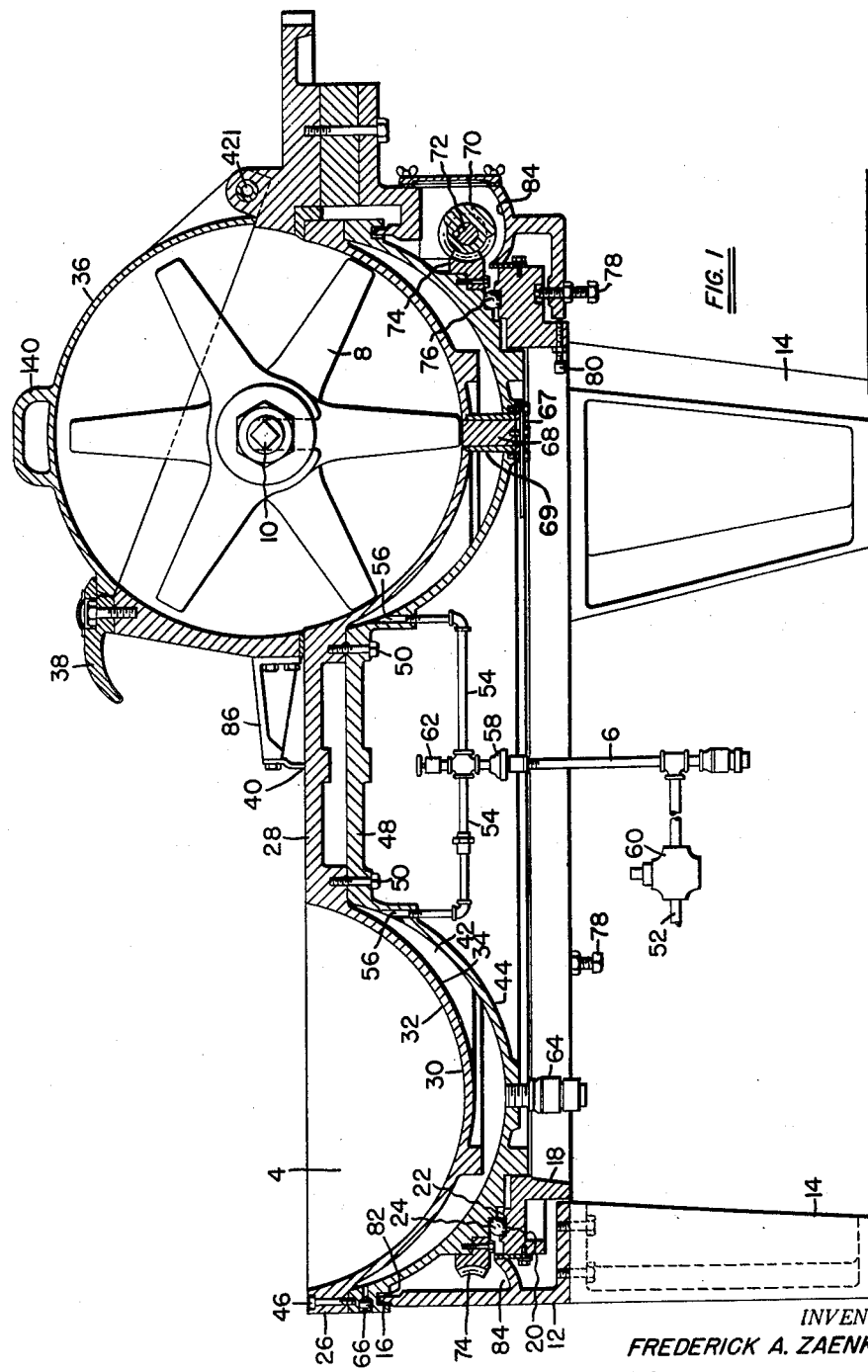

Dec. 16, 1958 F. A. ZAENKERT 2,864,302
MEANS FOR SIMULTANEOUSLY CUTTING AND COOKING MEAT PRODUCTS
Filed May 31, 1956

INVENTOR.
FREDERICK A. ZAENKERT
BY
J. Warren Kinney Jr.
ATTORNEY

United States Patent Office 2,864,302
Patented Dec. 16, 1958

2,864,302

MEANS FOR SIMULTANEOUSLY CUTTING AND COOKING MEAT PRODUCTS

Frederick A. Zaenkert, Greenhills, Ohio, assignor to The Cincinnati Butchers' Supply Company, Cincinnati, Ohio, a corporation of Ohio Application May 31, 1956, Serial No. 588,305

2 Claims. (Cl. 99—348)

The present invention relates to a method and apparatus for processing foodstuffs, including particularly meat and meat products.

An object of the invention is to provide for the treatment of foods in a manner such as to improve the quality and the palatability thereof.

Another object is to provide apparatus for the simultaneous mincing and cooking of a food, such as meat or a meat product, to enhance its flavor and prevent deterioration during the processing period.

A further object is to provide for maximum sanitation and needless handling in the preparation of minced and cooked foodstuffs, such as meat or meat products.

Another object is to provide simple, inexpensive, and improved mechanical means for accomplishing the objectives above specified, with substantial savings of time and labor.

The foregoing and other objects are attained by the means described herein and illustrated upon the accompanying drawing, in which the figure is a longitudinal cross-sectional view taken from end to end of a machine for processing food in accordance with the present invention.

The apparatus of the present invention is basically similar to the machine disclosed in greater detail in the patent of Zaenkert No. 2,549,657, dated April 17, 1951. The purpose of the machine is to cut and mince a food such as meat, which initially is placed in an annular continuous trough 4 that rotates horizontally about an upright axis including the tube 6, to bring the meat to a cutting means 8 which rotates rapidly upon a shaft 10 to mince the meat lying in the trough. The mincing operation is a continuous one, as the meat covering the bottom of the trough is slowly advanced progressively into the cutters and past them to be again brought around to the cutters as the trough member rotates slowly about its central axis.

In accordance with the present invention, the meat or food undergoing processing is to be cooked as it is carried around in the trough, the latter being heated to cooking temperature throughout the process, or until cooking is completed. This avoids unnecessary separate handling of the food, and greatly reduces the time during which the food is exposed to room temperature prior to hermetic packaging. As the result, much time and handling are conserved, and the food product is enhanced in flavor and wholesomeness to an extent not heretofore possible under conventional procedures.

With further reference to the drawing, 12 indicates a base or frame, preferably supported upon legs 14 which are bolted or otherwise secured to the frame. The frame may be in the form of a large circular drum as shown, having an upper peripheral edge 16. Supported within the confines of the drum-like frame is a fixed ring member 18 having an annular bearing race 20 formed in its uppermost face 22. The race is adapted to carry a substantial number of bearing balls 24, as shown.

The part which provides the annular trough 4 may be a metal casting or the like 26, circular in form, and having a central hub portion 28 whose middle point is on the axis of rotation of the bowl. The trough 4 may be in the nature of an annular depression formed in the material of the bowl, all around the hub 28 concentrically therewith. The trough includes a food-supporting wall 30, preferably arcuate in cross-section, and presenting an upper face 32 and a nether face 34. The arcuacy of the trough wall may correspond to the arc described by the cutting means, the knives 8 of which move in cutting paths transverse to the trough. It should be understood that a considerable number of knives project radially from the rapidly rotating cutter shaft 10, and the free ends of the knives move in close proximity to the trough wall in the performance of the food mincing operation. The cutter or blade assembly is to be driven preferably by electric motor, not shown, and should be enveloped by an arcuate hood 36 held in position over the cutter knives by means of one or more hood clamps 38. A handle 140 on the hood assists in the swinging of the hood about a pivotal mounting at 421, which is in fixed relation to the frame of the machine. The hood provides for access to the knives, exposing them for any inspection or attention which may be required.

From the foregoing, it should be apparent that a batch of material placed in the trough 4 will, upon rotation thereof about the central point 40, be carried to the cutting means 8 where the mincing action is imposed; and as the trough continues to rotate the material progressively emerges from the cutting means and comes around again for a subsequent pass through the cutting means. The number of times the material is so presented to the cutting means may be determined by the nature of the material, the degree to which it is to be minced, and possibly other factors. In practice, the material undergoing processing covers the whole bottom portion of the trough all around, so that the mincing operation is a continuous one until such time as the processing is completed and the material is scooped from the trough.

To provide for cooking of the material or food product simultaneously with the treatment above described, the trough is furnished with a suitable heating means, one form of which is illustrated by the drawing. As disclosed, the heating is performed with the use of a heating fluid such as steam for example, fed to a jacket space or chamber 42 underlying substantially the full length and width of the trough wall 30. To form the heating chamber, a shell 44 may be provided, corresponding substantially with the bowl 26 in shape and size, fixed to the bowl in any suitable manner as by means of bolts or equivalent means 46 arranged marginally of the trough. The shell may include a hub portion 48 suitably fastened as at 50 to the hub 28 of the bowl. The shell is spaced from the nether face 34 of the trough wall between the sets of fasteners 50 and 46, to provide the chamber 42, and where the shell contacts the bowl a fluid-tight connection is provided in order to preclude escape of heating fluid from the chamber.

Heating fluid may be delivered to chamber 42 through a main upright feed tube 6 which has connection with a source of supply 52, and one or more branch tubes 54 which lead from the feed tube to ports such as 56 in the wall of shell 44. The feed tube 6 preferably is stationary and axially aligned with the axis of rotation of the bowl. A rotary coupling or swivel connection 58 joins the branch tubes with the feed tube, to convey heating fluid to the branch tubes and chamber 42 while the bowl rotates and carries with it the branch tubes 54. The characters 60 and 62 indicate, respectively, a steam pressure regulating valve and a safety valve, the purpose of which is obvious. A steam trap 64 for the chamber 42 may be provided in accordance with best engineering practice, and at a high elevation in the chamber may be furnished an air vent or bleeder 66 for occasional relief of entrapped air from the chamber. A suitable plug 68, removable for assistance in cleaning and flushing the trough from time to time, may be provided if desired. As shown, the plug may rest upon a displaceable gasketed plate 67 bolted to the bottom of shell 44, and extends upwardly through a sleeve 69 which spans the jacket space 42. Displacement of plate 67 permits the plug to drop bodily from the sleeve, thereby to permit drainage of cleansing liquid from the trough by way of the open sleeve.

The means for rotating the bowl 26 and the shell 44 attached thereto, may consist of a worm 70 keyed or otherwise fixed upon a drive shaft 72, and meshing with a worm wheel 74 which is securely mounted circumferentially of the shell as shown. The worm may be driven from the same motor that actuates the cutting means 8. To provide for frictionless rotation of the bowl and shell assemblage, the shell may have an annular bearing race 76 to accommodate the bearing balls 24 supported in the complementary race of ring member 18, so that said assemblage rests upon the group of bearing balls while rotating axially of the ring member. The ring member 18, as previously pointed out, is stationarily supported upon the machine frame, but may be adjusted as to elevation and lateral disposition relative to the frame, by means of adjusting devices 78 and 80 disposed at various locations circumferentially of the ring member. This detail, however, forms no part of the present invention and need not be described in greater detail.

In the interests of safety and sanitation, the bowl may be provided with an annular inverted groove or channel 82 to receive the upper peripheral edge 16 of the drumlike base or frame section 12, said edge being adapted to ride freely within the groove or channel as the bowl rotates, thereby to present a close joint between the parts. The joint so formed performs also to prevent extraneous matter falling into the annular interior gutter 84 which normally carries a supply of lubricant for the driving worm 70.

The character 86 denotes a bracket for a scraper operative upon marginal portions of the trough, to return to the trough any spillage of minced food accidentally displaced incidental to operation of the cutter knives. This detail forms no part of the present invention, and need not therefore be treated further herein.

The foregoing explanation should suffice for disclosing the various advantages and improvements incorporated in the processing apparatus of the present invention. It should be understood in conclusion, that the apparatus is subject to various modications and changes in structural details, within the scope of the appended claims, without departing from the spirit of the invention.

What is claimed is:

1. Food processing apparatus comprising in combination, a circular bowl having an upright central axis of rotation, a circumferential edge portion, and a central hub concentric with said axis, the bowl having an annular concentric depression circumscribing the hub and providing an open trough for carrying food to be processed, said trough comprising an upper food-supporting face and a nether face, a circular shell coinciding substantially in size and shape with the circular bowl, and having a circumferential edge portion, a central hub on the shell contacting and underling the hub of the bowl, means securing the hub of the bowl to the hub of the shell for mutual support of the bowl and the shell centrally thereof, and circumferentially disposed means fixing the shell to the bowl in spaced relation to the nether face of the trough wall, thereby to provide an annular chamber which includes the nether face of the trough wall, a frame, a ring member fixedly mounted on the frame beneath the shell, and bearing means between the shell and the ring member to support the shell and the bowl for rotation relative to the ring member, means for rotating the shell and bowl assemblage about the upright central axis thereof, cutting means supported upon the frame and including knives to mince the food within the trough as the bowl rotates and moves the food past the knives of the cutting means, and means delivering a high-temperature heating fluid to the chamber aforesaid while the bowl rotates, for cooking the food within the trough while the food undergoes mincing at the cutting means.

2. Food processing apparatus comprising in combination, a circular bowl having an upright central axis of rotation, a circumferential edge portion, and a central hub concentric with said axis, the bowl having an annular concentric depression circumscribing the hub and providing an open trough for carrying food to be processed, said trough comprising an upper food-supporting face and a nether face, a circular shell coinciding substantially in size and shape with the circular bowl, and having a circumferential edge portion to register with the edge portion of the bowl, a central hub on the shell contacting and underlying the hub of the bowl, means securing the hub of the bowl to the hub of the shell for mutual support of the bowl and the shell centrally thereof, and circumferentially disposed means fixing the shell to the bowl in spaced relation to the nether face of the trough wall, thereby to provide an annular chamber which includes the nether face of the trough wall, a frame, means supporting the bowl and shell assemblage upon the frame for axial rotation, cutting means supported upon the frame and including knives to mince the food within the trough as the bowl rotates, and means delivering a high-temperature heating fluid to the chamber while the bowl rotates, for cooking the food within the trough concurrently with mincing thereof by the cutting means.

References Cited in the file of this patent

UNITED STATES PATENTS

| | | |
|---|---|---|
| 338,583 | Burkhard | Mar. 23, 1886 |
| 545,180 | Steigert | Aug. 27, 1895 |
| 1,240,165 | Balzarini | Sept. 18, 1917 |
| 2,208,651 | Wallace | July 23, 1940 |
| 2,386,775 | Balzarini | Oct. 16, 1945 |
| 2,406,769 | Hosman | Sept. 3, 1946 |
| 2,549,657 | Zaenkert | Apr. 17, 1951 |

FOREIGN PATENTS

| | | |
|---|---|---|
| 36,318 | Switzerland | Aug. 6, 1906 |
| 895,862 | Germany | Nov. 5, 1953 |